(12) United States Patent
Ciccarelli (10) Patent No.: US 7,130,602 B2
(45) Date of Patent: Oct. 31, 2006

(54) DYNAMICALLY PROGRAMMABLE RECEIVER

(75) Inventor: Steven C. Ciccarelli, Ramona, CA (US)

(73) Assignee: Qualcomm Incorporated, San Diego, CA (US)

( * ) Notice: Subject to any disclaimer, the term of this patent is extended or adjusted under 35 U.S.C. 154(b) by 257 days.

(21) Appl. No.: 10/690,655

(22) Filed: Oct. 21, 2003

(65) Prior Publication Data

US 2004/0142670 A1 Jul. 22, 2004

Related U.S. Application Data

(60) Provisional application No. 60/471,227, filed on May 16, 2003, provisional application No. 60/423,218, filed on Oct. 31, 2002.

(51) Int. Cl.
*H04B 1/06* (2006.01)
*H04B 7/00* (2006.01)

(52) U.S. Cl. .................... 455/240.1; 455/239.1; 455/234.1; 455/245.1; 455/245.2; 455/249.1; 330/129

(58) Field of Classification Search ............ 455/232.1, 455/337, 254, 340, 234.1, 234.2, 235.1, 227, 455/334, 338; 341/143, 138, 139; 330/129, 330/149, 296, 285, 283
See application file for complete search history.

(56) References Cited

U.S. PATENT DOCUMENTS 5,361,072 A * 11/1994 Barrick et al. ............. 342/133

| | | | |
|---|---|---|---|
| 5,722,061 A | 2/1998 | Hutchison et al. | |
| 6,134,430 A * | 10/2000 | Younis et al. | ............... 455/340 |
| 6,175,279 B1 * | 1/2001 | Ciccarelli et al. | ........... 330/296 |
| 6,498,926 B1 * | 12/2002 | Ciccarelli et al. | ........ 455/240.1 |
| 2002/0132597 A1 | 9/2002 | Peterzell et al. | |

FOREIGN PATENT DOCUMENTS

WO     9930426     6/1999

* cited by examiner

*Primary Examiner*—Edward F. Urban
*Assistant Examiner*—Thuan T. Nguyen
(74) *Attorney, Agent, or Firm*—Philip R. Wadsworth; Charles D. Brown; Kenyon S. Jenckes (57) ABSTRACT

Disclosed is a novel and improved dynamically programmable linear receiver which provides the required level of system performance with reduced power consumption. In one embodiment, disclosed is a programmable receiver coupled to a jammer detector for detecting the presence of jamming in an RF signal, the jammer detector coupled to a state machine, and the state machine having means for controlling the receiver based on the results of the jammer detector detecting the presence of jamming in the RF signal. The disclosed receiver is capable of detecting the presence of jammers, with a means to adjust the bias current downward if no jammers are present, which improves the receiver's standby time and prolongs battery life.

28 Claims, 8 Drawing Sheets

| | UP BITS > 50% (504) | Jam_det | TURBO MODE (506) |
|---|---|---|---|
| 508 | 0 | 0 | 0 |
| 510 | 0 | 1 | 1 |
| 512 | 1 | 0 | 1 |
| 514 | 0 | 1 | 1 |

FIG. 5

| JAMMER DETECTOR OUTPUT (1-BIT A/D) | SIGNAL STRENGTH (RSSI) | Ecp/Io | LINEARITY | LPF STATE |
|---|---|---|---|---|
| LOW | WEAK | X | LOW | MATCHED |
| LOW | STRONG | LOW | LOW | MATCHED |
| LOW | STRONG | HIGH | LOW | LOW ICI |
| HIGH | WEAK | X | HIGH | MATCHED |
| HIGH | STRONG | LOW | HIGH | MATCHED |
| HIGH | STRONG | HIGH | LOW | LOW ICI |

DYNAMICALLY PROGRAMMABLE RECEIVER

CROSS-REFERENCE TO RELATED APPLICATIONS

This application claims the benefit of U.S. Provisional Application Ser. No. 60/423,218 filed on Oct. 31, 2002 and U.S. Provisional Application Ser. No. 60/471,227 filed on May 16, 2003.

FIELD OF THE DISCLOSURE

The present disclosure relates to wireless telecommunications and, more particularly, relates to an improved programmable linear receiver.

BACKGROUND

The design of a high performance receiver is made challenging by various design constraints. First, high performance is required for many applications. High performance can be described by the linearity of the active devices (e.g. amplifiers, mixers, etc.) and the noise figure of the receiver. Second, for some applications such as in a cellular communication system, power consumption is an important consideration because of the portable nature of the receiver. Generally, high performance and high efficiency are conflicting design considerations.

An active device has the following transfer function:

$$Y(x) = a_1 \cdot x + a_2 \cdot x^2 + a_3 \cdot x^3 + \text{higher order terms}, \quad (1)$$

where x is the input signal, y(x) is the output signal, and $a_1$, $a_2$ and $a_3$ are coefficients which define the linearity of the active device. For simplicity, higher order terms (e.g. terms above third order) are ignored. For an ideal linear, active device, the coefficients $a_2$ and $a_3$ are 0.0 and the output signal is simply the input signal scaled by $a_1$. However, all active devices experience some amount of non-linearity which is quantified by the coefficients $a_2$ and $a_3$. Coefficient $a_2$ defines the amount of second order non-linearity and coefficient $a_3$ defines the amount of third order non-linearity.

Most communication systems are narrow band systems which operate on an input RF signal having a predetermined bandwidth and center frequency. The input RF signal typically comprises other spurious signals located throughout the frequency spectrum. Non-linearity within the active device causes intermodulation of spurious signals, resulting in products which may fall into the signal band.

The effect of second order non-linearity (e.g. those caused by the $x^2$ term) may be reduced or eliminated by careful design methodology. Second order non-linearity produces products at the sum and difference frequencies. Typically, the spurious signals which can produce in-band second-order products are located far away from the signal band. However, third order non-linearity are more problematic. For third order non-linearity, spurious signals $x = g_1 \cdot \cos(w_1 t) + g_2 \cdot \cos(w_2 t)$ produce products at the frequencies $(2w_1 - w_2)$ and $(2w_2 - w_1)$. Thus, near band spurious signals (which are difficult to filter) can produce third order intermodulation products falling in-band, causing degradation in the received signal. To compound the problem, the amplitude of the third-order products are scaled by $g_1 \cdot g_2^2$ and $g_1^2 g_2$. Every 1 dB increase in the input RF signal results in 1 dB increase in the output RF signal but 3 dB increase in the third order products.

The linearity of a receiver (or the active device) can be characterized by the input-referred third-order intercept point (IIP3). Typically, the output RF signal and the third-order intermodulation products are plotted versus the input RF signal. As the input RF signal is increased, the IIP3 is a theoretical point where the desired output RF signal and the third-order products become equal in amplitude. The IIP3 is an extrapolated value since the active device goes into compression before the IIP3 point is reached.

Receivers are employed for many communication applications, such as cellular communication systems. Example cellular communication systems include Code Division Multiple Access (CDMA) communications systems, Time Division Multiple Access (TDMA) communication systems, and analog FM communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", and U.S. Pat. No. 5,103,459, entitled "SYSTEM AND METHOD FOR GENERATING WAVEFORMS IN A CDMA CELLULAR TELEPHONE SYSTEM", both assigned to the assignee of the present disclosure and incorporated by reference herein.

In cellular applications, it is common to have more than one communication system operating within the same geographic coverage area. Furthermore, these systems can operate at or near the same frequency band. When this occurs, the transmission from one system can cause degradation in the received signal of another system. CDMA is a spread spectrum communication system which spreads the transmit power to each user over the entire 1.2288 MHz signal bandwidth. The spectral response of an FM-based transmission can be more concentrated at the center frequency. Therefore, FM-based transmission can cause jammers to appear within the allocated CDMA band and very close to the received CDMA signal. Furthermore, the amplitude of the jammers can be many times greater than that of the CDMA signal. These jammers can cause third-order intermodulation products which can degrade the performance of the CDMA system.

Typically, to minimize degradation due to intermodulation products caused by jammers, the receiver is designed to have high IIP3. However, design of a high IIP3 receiver requires the active devices within the receiver to be biased with high DC current, thereby consuming large amounts of power. This design approach is especially undesirable for cellular application wherein the receiver is a portable unit powered by a battery and power is limited.

Several techniques have been deployed in the prior art to address the need for high IIP3. One such technique, which also attempts to minimize power consumption, is to implement the gain stage with a plurality of amplifiers connected in parallel and to selectively enable the amplifiers as higher IIP3 is needed. This technique is disclosed in detail in U.S. Pat. No. 6,069,525, entitled "DUAL MODE AMPLIFIER WITH HIGH EFFICIENCY AND HIGH LINEARITY", assigned to the assignee of the present disclosure and incorporated by reference herein. Another technique is to measure the received RF (radio-frequency) signal power and adjust the gain of the amplifiers based on the amplitude of the RF signal power. This technique is disclosed in detail in U.S. Pat. No. 5,722,061, entitled "METHOD AND APPARATUS FOR INCREASING RECEIVER POWER IMMUNITY TO INTERFERENCE", assigned to the assignee of the present disclosure and incorporated by reference herein. These techniques improve the IIP3 performance.

An example block diagram of a receiver architecture of the prior devices is shown in U.S. Pat. No. 6,498,926 entitled "PROGRAMMABLE LINEAR RECEIVER HAVING A VARIABLE IIP3 POINT", which is assigned to the assignee of the present disclosure and the patent is incorporated by reference in its entirety as if set out in full herein.

Receiver architectures to the present date have several drawbacks. First, the active devices are typically biased to a high DC current to provide the highest required IIP3. This has the effect of operating the receiver at the high IIP3 operating point at all times, even though high IIP3 is not required most of the time. Second, the high IIP3 can be improved by adjusting the gain of Automatic Gain Control (AGC) amplifier; however, lowering the gain of the amplifier can degrade the noise figure of the receiver.

SUMMARY

Disclosed is a novel and improved dynamically programmable linear receiver which provides the required level of system performance with reduced power consumption. In one embodiment, disclosed is a programmable receiver with a jammer detector for detecting the presence of jamming in an RF signal, the jammer detector is coupled to a state machine, and the state machine having means for controlling the receiver based on the results of the jammer detector detecting the presence of jamming in the RF signal. The receiver includes RF analog and digital circuitry. Therefore, disclosed is a receiver that is capable of detecting the presence of jammers, with a means to adjust the bias current downward if no jammers are present, which improves the receiver's standby time and prolongs battery life.

In another embodiment, disclosed is a programmable receiver with a transmit rejecting circuit, such as a surface acoustic wave (SAW) filter. A mixer is coupled to the output of the transmit rejecting circuit and an oscillator is coupled to the mixer. A low pass filter is coupled to the output of the mixer and a jammer detector is coupled to the output of the mixer before the input of the low pass filter. The jammer detector may be located anywhere in the receiver before the lowpass filter.

Also disclosed is a method of providing programmable linearity in a receiver, including the steps of detecting the presence of jamming in the RF signal, providing the results of the detection of the presence of jamming in the RF signal to a state machine, and the state machine controlling the current or filter, or both, of the receiver based on the results of detecting the presence of jamming in the RF signal. Or, in the alternative, the state machine may control the current or the filter, or a combination of the current and the filter.

Also disclosed is a method of providing programmable linearity in a receiver, including the steps of detecting the presence of jamming in an RF signal, measuring the amount of jamming in the RF signal, comparing the amount of jamming in the RF signal versus a threshold amount, and providing the results of the measured amount of jamming in the RF signal to a state machine, wherein the state machine controls the receiver based on the results of the measured amount of jamming in the RF signal so as to lower the power consumption of the receiver when jamming is not present in the RF signal. The receiver may be an analog or a digital receiver.

BRIEF DESCRIPTION OF THE DRAWINGS

The disclosure will now be described in greater detail with reference to the preferred embodiments illustrated in the accompanying drawings, in which like elements bear like reference numerals, and wherein.

DETAILED DESCRIPTION

The receiver of the present disclosure provides the required level of system performance and minimizes power consumption by any wireless device that is powered by a battery by controlling the DC bias of the active devices. The receiver of the present disclosure operates in a jammer present mode, and a no-jammer present mode, and the receiver is capable of detecting the presence of jammers, as will be described in detail below and, the receiver adjusts a combination of the bias current, effective number of bits in the analog to digital converter, or the sample rate of the digital circuitry and programs filters accordingly in the absence of jammers, which lowers power consumption and thereby improves standby time by prolonging battery life.

Figure 1:
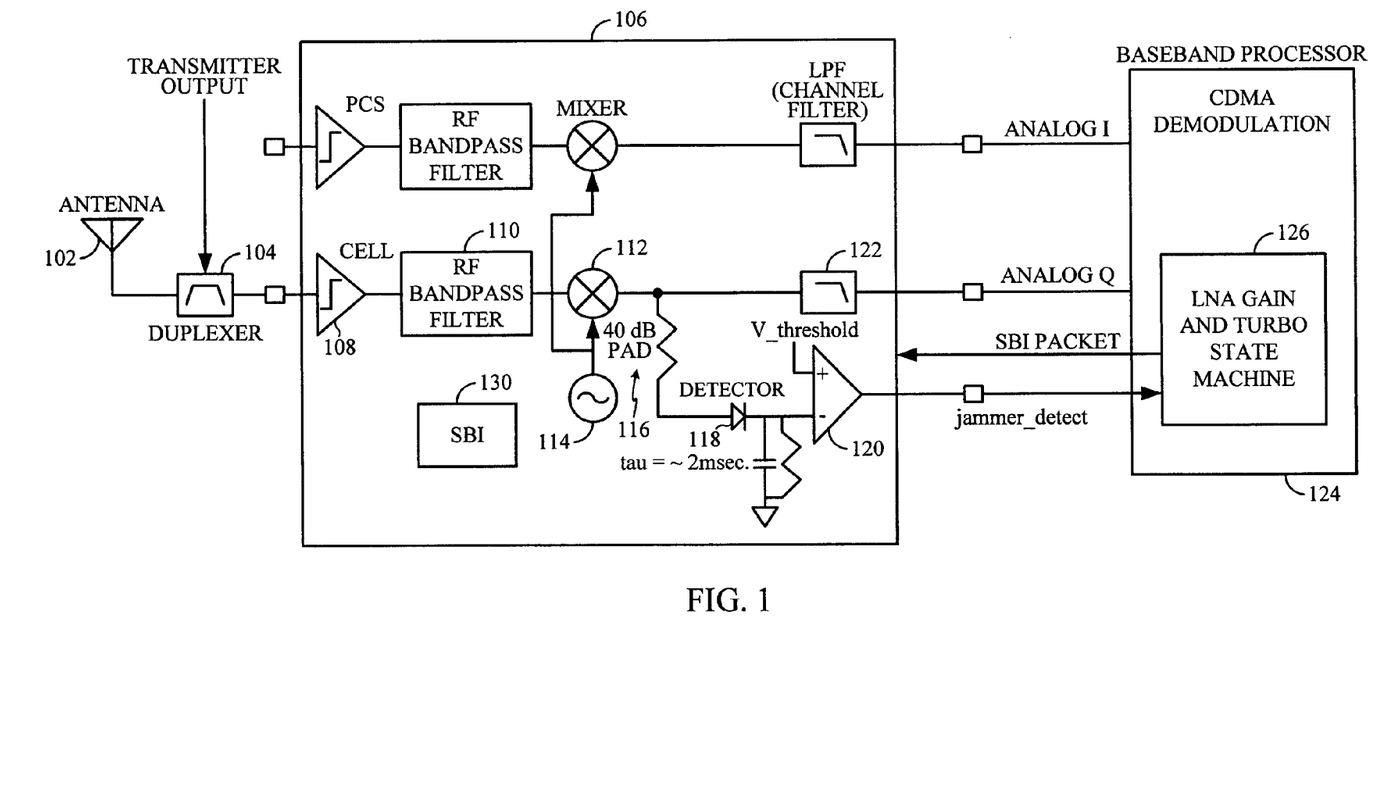
FIG. 1 is a block diagram of an example receiver according to the present disclosure.

FIG. 1 illustrates a portion of a block diagram for a dual-band, quad-mode transceiver, however, according to the present disclosure, the disclosed system and method may be used with any configuration of cellular device, such as CDMA, TDMA, GSM, single band, etcetera, and generally referred to herein as a receiver. The receiver is shown with an antenna 102 coupled to an RF filter. By way of example, the RF filter may be a radio frequency surface acoustic wave (SAW) filter with the output coupled to a chip set 106. Internal of the chip set 106 is a low noise amplifier (LNA), which may be coupled to an adaptive filter 110, but the adaptive filter 110 is not required. The adaptive filter 110 may be a RF bandpass filter. Coupled to the adaptive filter 110 is a mixer 112, with an oscillator 114 coupled to the mixer 112. The output of the mixer may be, by way of example, at approximately 0 Hz. A node branches off of the output of the mixer 112 with a programmable variable attenuator, and the programmable variable attenuator may be, by way of example a 40 dB pad, located after the node but before a jammer detector 118. The output of the jammer detector 118 is coupled to a comparator 120 or to an analog to digital converter with an established voltage threshold. The threshold voltage for the comparator may be, by way of example, a 30 mV for a 40 dB coupling. The programmable variable attenuator eliminates any signal leaking back from the jammer detector 118 to the mixer 112. The output of mixer 112 is also coupled with a low pass filter (LPF) 122. This configuration allows the jammer detector 118 to detect the presence of jamming in an RF signal prior to the LPF 122 filtering the jamming elements out of the RF signal. Interference in an RF signal and in a receiver may be defined as jamming in an RF signal, and the present disclosure utilizes a jammer detector for detecting the presence of jamming in an RF signal.

The output of the comparator 120 is coupled to a baseband processor, or by way of example, a mobile station modem (MSM) 124, or the like, which includes a state machine 126 coupled to a receiver. The baseband processor 124 provides demodulation functions, such as CDMA demodulation. As described below, the state machine determines and may control many items, including whether the receiver should be in turbo mode or nonturbo mode. Generally, turbo mode is selected if a few characteristics are present in the receiver, such as the presence of strong interference (a jammer), poor signal-to-noise ratio,. If the signal characteristics or thresholds are not met, then the receiver goes into nonturbo mode. By way of example, using a one bit input to the state machine, the state machine utilizes a truth table as follows:

| JAMMER | SIGNAL | STATE |
| --- | --- | --- |
| High | Weak | Turbo |
| Low | Weak | Non-Turbo |
| High | Strong | Turbo |
| High | Very Strong | Non-Turbo |
| Low | Strong | Non_Turbo |

Figure 6:
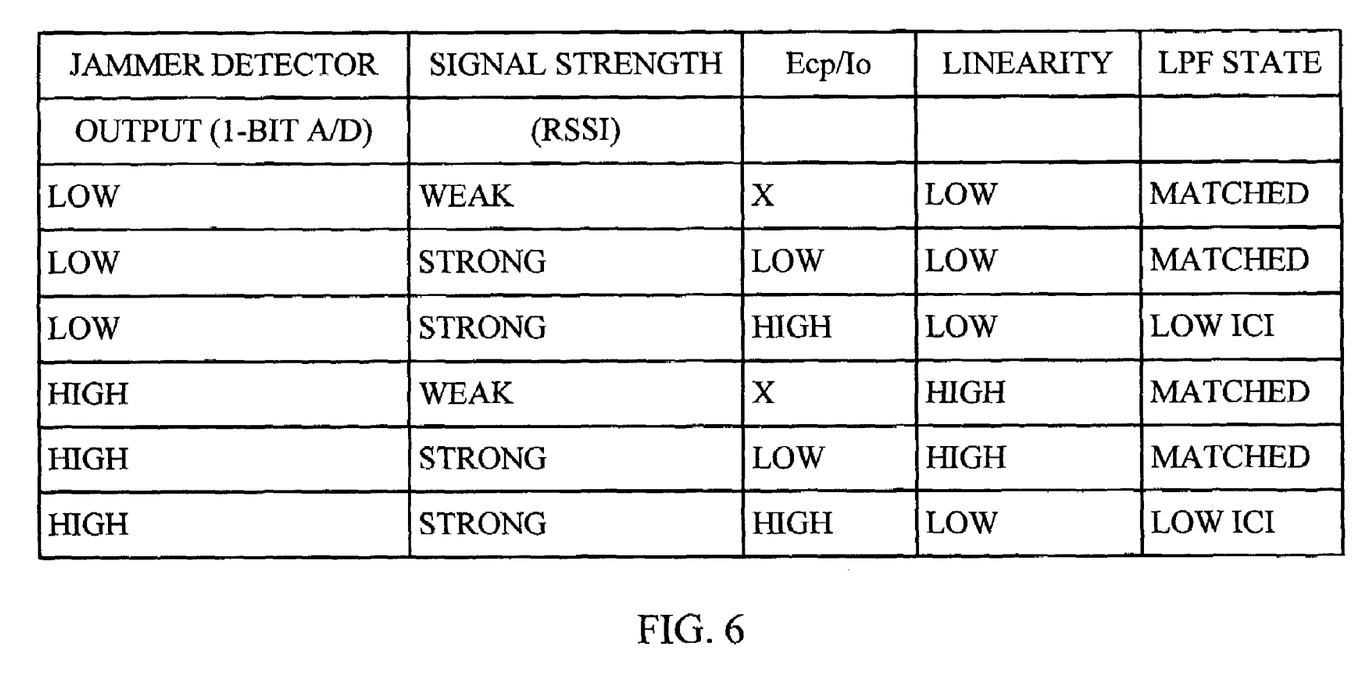
FIG. 6 is a truth table illustrating alternate logic that may be used by the state machine to control the power level of the receiver.

Another example of an alternative embodiment is shown in a truth table shown in FIG. 6, wherein the output of the analog to digital converter is coupled to a baseband processor, or the like. The baseband processor may include a state machine coupled to a receiver. The state machine determines the receiver's configuration. The operating modes of the receiver include high and low linearity, low noise, and high and low AGC dynamic range. The channel filter modes include low ICI, matched, maximal jammer rejection, and bypass mode. The bypass mode provides only minimal anti-aliasing functionality. The state machine takes as inputs the output of the jammer detector, an estimate of Ecp/Io, if required, and a measurement of signal strength. The output is linearity state, the state of the LPF, and receiver gain. Matched in the table means there is a matched filter and Ecp represents a measurement of signal in the system. An "X" in the truth table denotes an element that is not required to determine the output of the state machine.

As further explained below, by observing the output of the jammer detector and received signal strength indicator (RSSI), the receiver can be configured for optimal performance. The number of bits in the analog to digital converter (ADC), the filter bandwidth for pulse shaping, and linearity for jammer immunity are controlled. In turbo mode, the filter is optimized for jammer rejection, and in nonturbo mode, the filter's is pulse shaping is optimized for low ISI.

The state machine, according to the present disclosure, may control the state of the receiver, that is turbo mode state or non-turbo mode state, by evaluating Ecp/Io estimate or the power control bits, only the jammer detection, or a combination of evaluating the power control bits and the jammer detection. The state machine also may control the receiver by making dynamic adjustments based on a dynamic range of the receiver by averaging Ecp/Io or power control bits. In addition, in a shared memory situation, the state machine may look at multiple jammers over time, and by utilizing a fast fourier transform (FFT) calculation, the state machine may detect harmful jammers and control the receiver accordingly.

The output of the state machine is to a serial bus interface (SBI) which feeds back to SBI 130 and the chipset 106. The jammer detector detects the presence of jamming in the RF signal and if jamming is present in the RF signal, the state machine 126 will, make a decision regarding the power consumption level of the receiver based on a signal level and based on the presence of jamming in the RF signal. The state machine 126 then communicates with receiver 106 and 124 to program a mode that is either low current or high current Specific components, such as the mixer 112, may be programmed into a low current mode to lower the power consumption of the receiver, or conversely may be programmed into a high current mode. In the digital domain, the coefficients of a programmable digital filter may be adjusted to compensate for a lower power consumption to duplicate what may be done with the present disclosure in the analog domain. Therefore, the programmable receiver disclosed herein is a dynamically programmable receiver, wherein the power consumption mode may be adjusted based upon the channel conditions that the receiver is experiencing. The state machine further includes means for maintaining the constant gain in the receiver, such as through a gain offset, for the transition to and from turbo mode to nonturbo mode.

Figure 2:
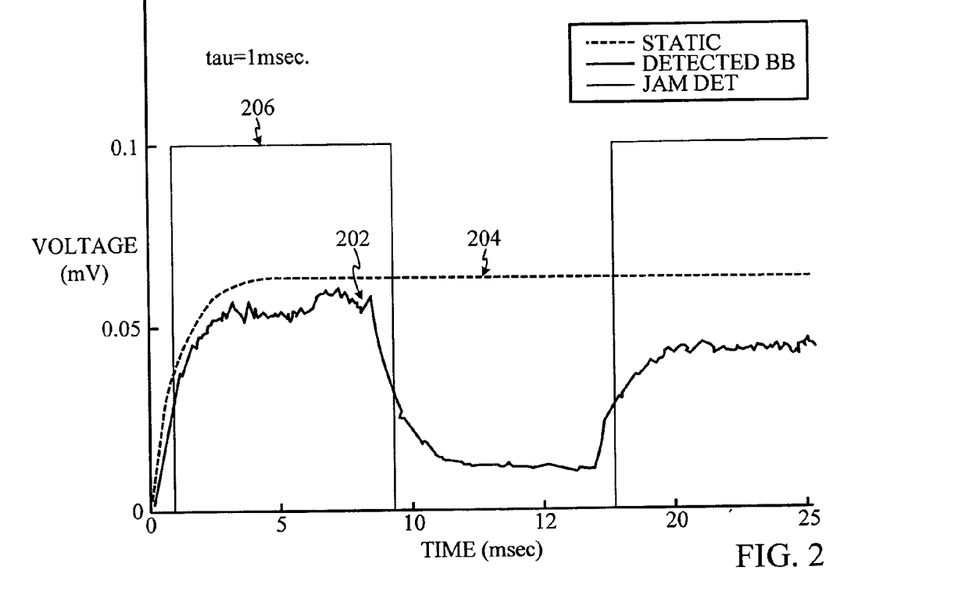
FIG. 2 is a graph illustrating a detected baseband signal that is fading.

FIG. 2 illustrates jammer detection when a mobile phone is traveling, by way of example, at a rate of 60 kmph with deep fading occurring approximately before 10 msec relative to time shown in the figure. Line 202 depicts the detected baseband subject to the fading with segment 204 depicting a detected continuous wave (CW) RF signal with no fading. The deep fading from the detected baseband 202 is eliminated at approximately 17 msec with a shown rise in voltage of the detected baseband signal. Jammer detector output is exhibited at 206. The tau in FIG. 2 is set at 1 msec.

Figure 3:
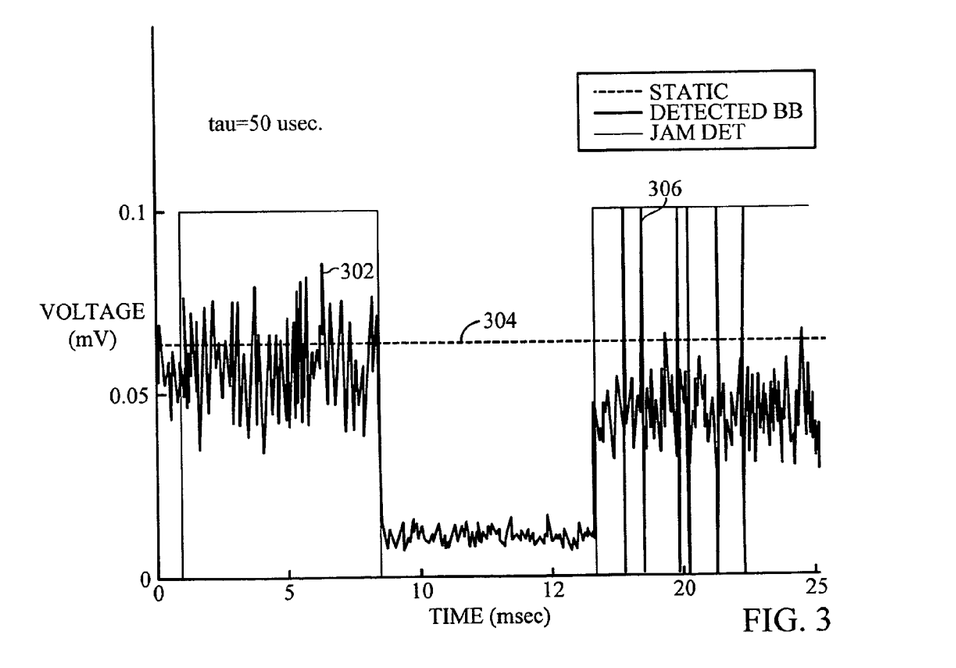
FIG. 3 is a graph illustrating a signal with jamming detected by the jammer detector and with the time constants at 50 μsec.

FIG. 3 illustrates tau set at 50 μsec, with the detected baseband 302, and detected CW with no fading at segment 304. A one-bit jammer detector output is exhibited at 306, in which the interference is detected by the jammer detector. This illustrates that the jammer detector feeds into the state machine the presence of jamming in the RF signal.

Figure 4:
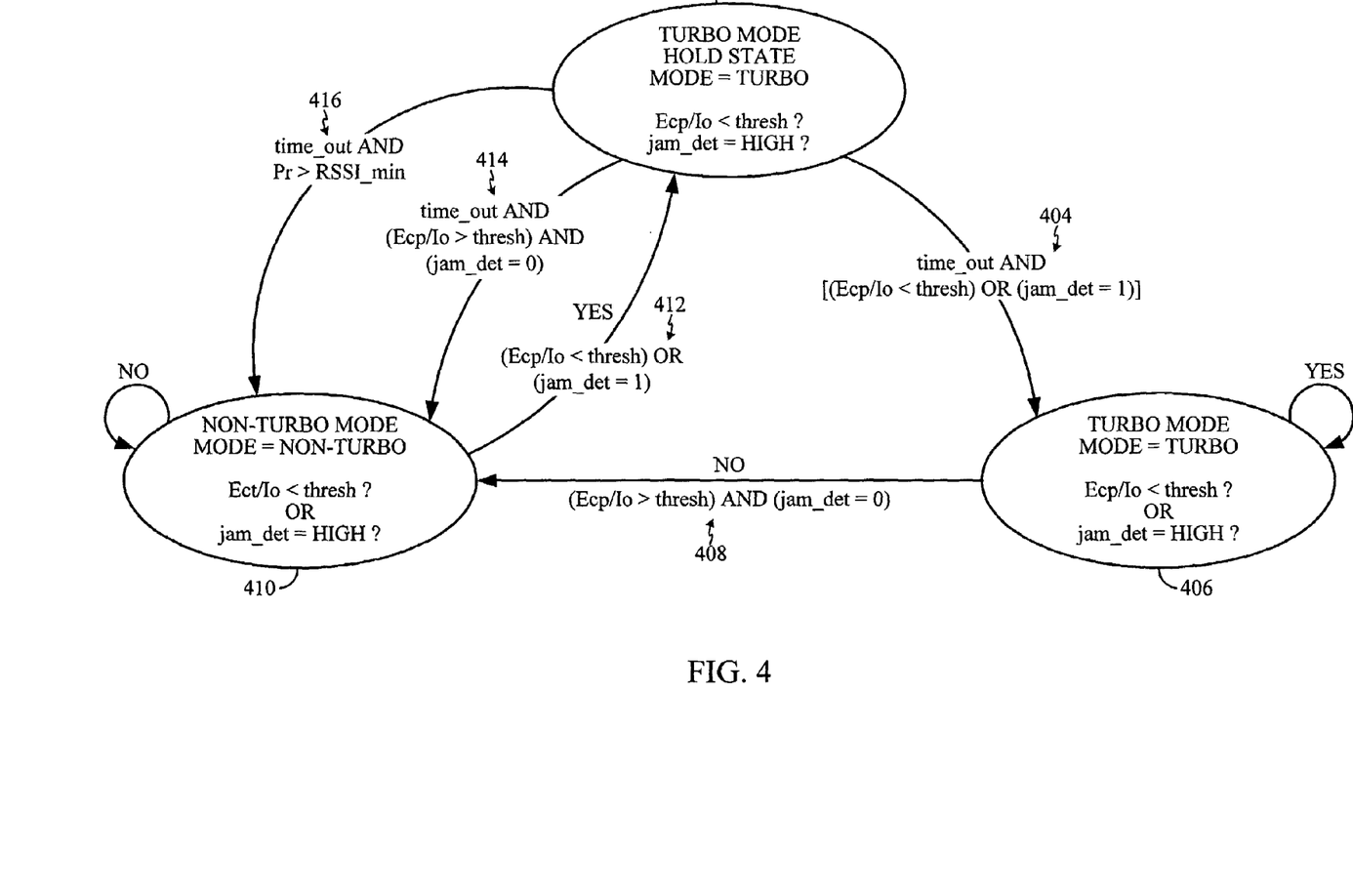
FIG. 4 is a schematic diagram of the logic that determines how the state machine controls the bias in the receiver according to the present disclosure.

FIG. 4 illustrates, by way of example, a logic map for estimating the channel condition and for controlling the components in the receiver. CDMA 2000 includes a fastforward link power control which allows the estimation of the channel condition, which includes the carrier to noise ratio (Ecp/Io). If the Ecp/Io is poor for the forward link (FL), the reverse link (RL) communicates with the base station and requests additional FL traffic channel gain. If the Ecp/Io is favorable for the system, the RL will communicate with the base station to request less PL traffic channel gain. In the situation that the receiver has jammers or other unfavorable conditions, the calculation of Ecp/Io will be poor and the state machine will configure the receiver accordingly with the goal to lower the current in the receiver while maintaining acceptable performance.

The requests for more or less traffic channel gain are determined by the state machine. If the turbo-mode is in the hold state, and if the channel has a poor Ecp/Io, the system will hold at turbo-mode for a period of time, which allows for settling and keeps the receiver from chattering between states. Therefore, a timer in the system (not shown) provides temporal hysteresis. Therefore, the system may include temporal hysteresis with a time-out at each state. Also, the system is configured so that turbo-mode is established quickly, but so that turbo-mode is slower to transition to nonturbo mode, therefore the state machine is powered on in the turbo-mode hold state, and the timer is long enough to estimate the Ecp/Io or up bits by averaging the power control bits or the Ecp/Io, or both, yet short enough to save current Therefore, the receiver gets to turbo-mode quickly and goes to non-turbo mode cautiously. Further, the timer provides temporal hysteresis so the receiver does not oscillate between modes. Therefore, the turbo-mode may be invoked either through jammer detection through the circuit, or by counting power control up bits.

In the power control, typically present are up bits and down bits, and when more traffic channel gain is requested, the request is equal to an up bit, or when less traffic channel gain is requested the less traffic request is determined to be a down bit. In one example, eight consecutive bits are sampled over a period of 6.25 msec and if five or more of the eight consecutive are up bits, then the up bits are greater than fifty percent, however, any other method of counting and comparing up bits to down bits may be used.

Therefore, as shown in state 402, in the turbo-mode hold state, the mode is equal to turbo-mode and the inquiry is made as whether the up bits are greater than fifty percent or whether the Ecp/Io is below a determined threshold and whether jamming has been detected in the RF signal, depicted here as jam_det=HIGH. As shown in 404, if the timer expires and up bits are greater than fifty percent or whether Ecp/Io is less than a determined threshold, or if jam_det is equal to logical HIGH, then the turbo-mode hold state is converted to turbo-mode as shown in 406. A determination is then made by the state machine whether up bits are less than fifty percent or whether Ecp/Io is greater than a determined threshold and whether jam_det is equal to logical LOW, as shown in 408. If true, then the turbo-mode state shown in 406 is converted to non-turbo-mode shown in 410. Then a determination is made whether up bits are greater than fifty percent or whether Ecp/Io is less than a determined threshold and whether jam_det is equal to HIGH; if yes, then as shown is 412, the non-turbo-mode 410 is changed to turbo-mode hold state in 402. From the turbo-mode hold state if time_out AND (up bits less than 50% or Ecp/Io is greater than a threshold) and jam_det is equal to LOW as shown in 414, then turbo-mode hold state 402 is changed to non-turbo-mode as shown 410. Also, turbo mode hold state is changed to non-turbo mode when the received power, Pr is above a above a threshold, RSSI_min 416. RSSI is the received signal strength indicator. RSSI is reported in mobile phones through the AGC (automatic gain control). RSSI_min is the minimum power above which the receiver defaults to non-turbo mode, after the timer expires. Above this threshold, the jammers are typically inconsequential. The threshold is programmable.

Therefore, disclosed herein are multiple embodiments to provide a state machine. The state machine may be incorporated into an integrated chip (IC), otherwise known as an integrated circuit. For example, a baseband processor, RF chip, and similar chips. The state machine can be configured to operate in a standalone IC or in combination with other integrated chips.

The state machine may be incorporated into the hardware with the baseband processor interfacing with the RF chip. Another embodiment includes a state machine that is software controlled, which provides a flexible way to control the receiver by utilizing software. By utilizing software, the parameters and architecture may be modified with a simple software revision.

Figure 9:
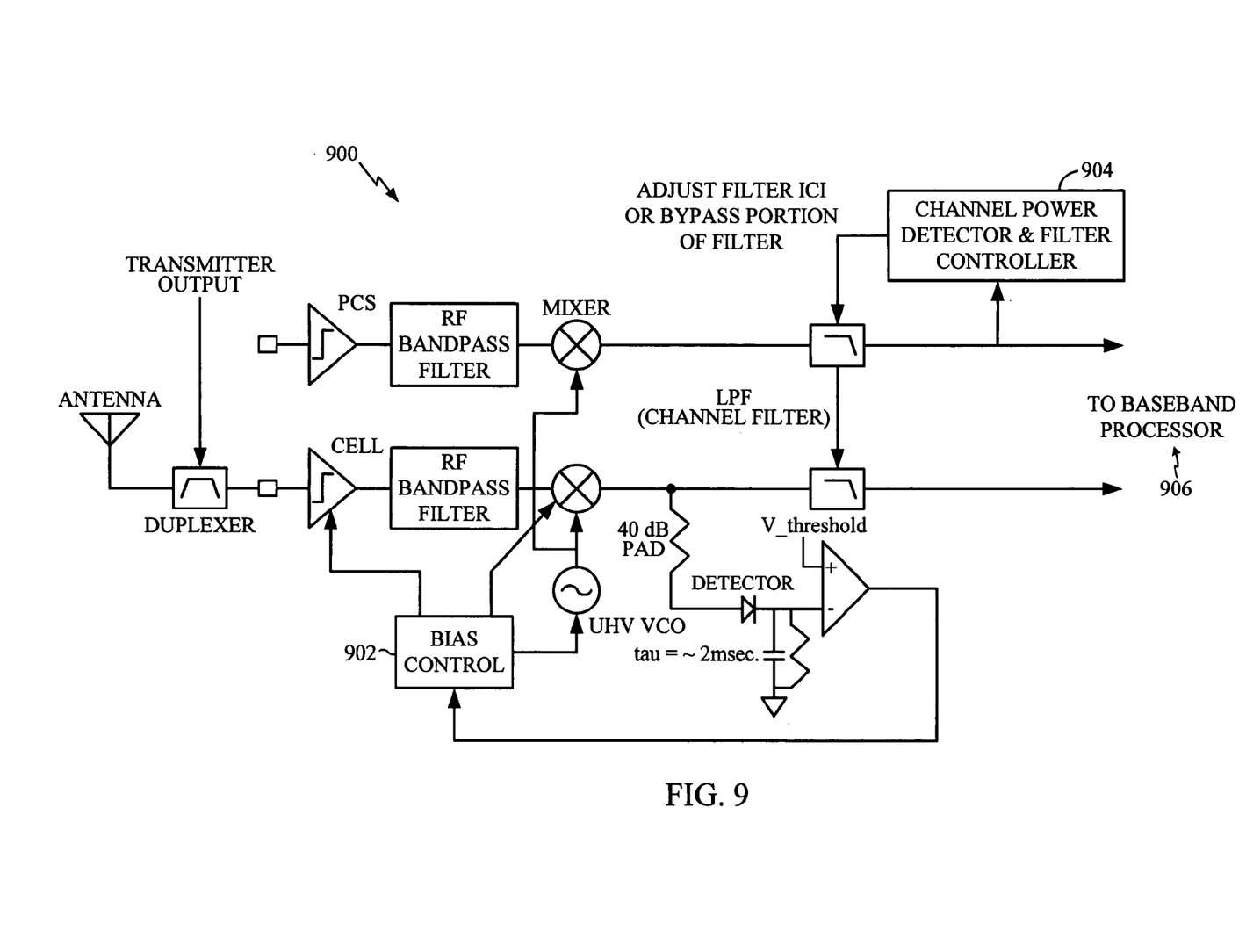
FIG. 9 is a block diagram of an example embodiment according to the present disclosure without a baseband processor.

Another embodiment is shown in FIG. 9, wherein a simple and direct control is providing through a switch or combination of switches. For example, if the RF chip jammer detector goes to HIGH, in an autonomous fashion, the output is fed to bias control circuitry on the RF chip itself to control the bias for multiple or all of the circuit blocks on the chip. FIG. 9 illustrates circuit 900, which could be located on a chip or off of a chip. The circuit includes several of the components shown in FIG. 1, but circuit 900 includes the bias control 902, to control the bias for the circuit blocks on the chip. Channel power detector and filter controller 904 adjusts the filter ICI or bypasses a portion of the filter. The output of the circuit is fed to a baseband processor as shown at 906. Accordingly, this embodiment may be incorporated into an RF chip without a baseband processor.

Figure 8:
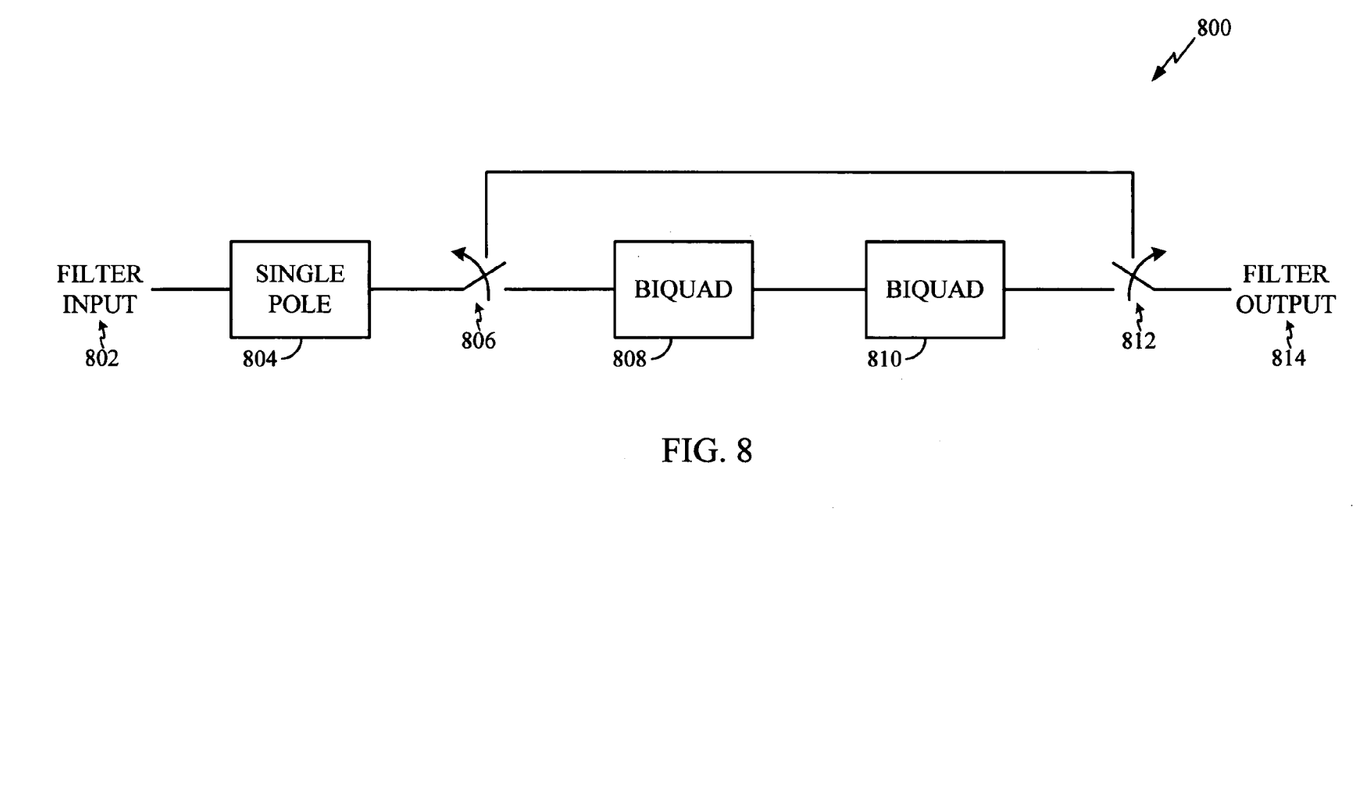
FIG. 8 is a block diagram illustrating a filter bypass configuration according to the present disclosure.

FIG. 8 illustrates filter bypass circuitry 800 with filter input 802 fed into single pole 804, which the output is fed into a first switch 806. When the switch 806 is off, the output of single pole 804 is fed into a first biquad filter 808 and then a second biquad filter 810. The output of biquad filter 810 is fed to a second switch 812 is feeds to a filter output 814. This arrangement of biquad filters comprises a special filter known as a gmc, but several types of filter arrangements may be used in this embodiment and the gmc filter is shown in FIG. 8 by way of example only, and any filter combination would work in this embodiment as long as a portion or portions of the low pass filter circuitry may be bypassed and powered off to save power in the receiver. In this example, RC or capacitively coupled resonant stages could be used as well.

Figure 5:
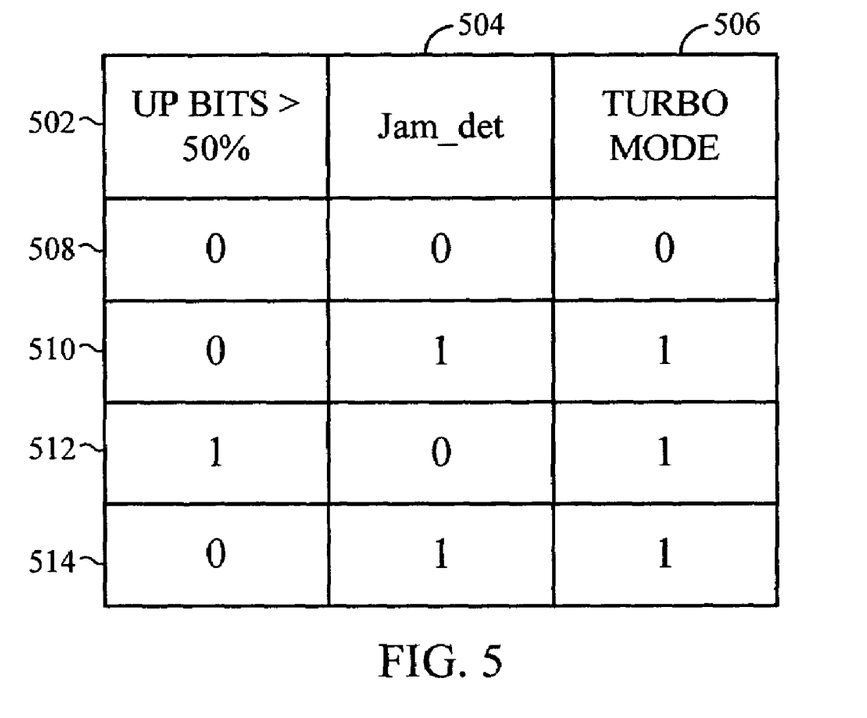
FIG. 5 is a truth table illustrating the logic used by the state machine to control the power level of the receiver according to the present disclosure.

FIG. 5 is an example truth table for the turbo-mode state machine for detecting up bits or jam_det, wherein turbo-mode equals (up bits) OR (jam_det) and wherein non-turbo-mode equals Not(up bits) AND Not(jam_det). By way of example, after eight consecutive up bits are considered in a sample timeframe, such as 6.25 msec, if some threshold, such as five or more are up, by way of example, then up-bits are greater than fifty percent, and the state machine requests turbo-mode. Also, by way of example, if three or less bits are up, then up bits are less than fifty percent, and the state machine checks jam_det to decide on turbo-mode. If either jam_det or up bits of greater than fifty percent are present, then the state machine selects turbo-mode. If up bits are less than fifty percent and jam_det is not present, then turbo-mode is not selected. As shown in FIG. 5, column 502 illustrates up bits greater than fifty percent, column 504 illustrates jam_det, and turbo-mode selection is illustrated in column 506. Rows 508, 510, 512 and 514 illustrate the different conditions that may be present. In FIG. 5, the presence of a zero indicates a false and the presence of a number 1 indicates a true. Therefore, as shown in this example, turbo-mode is not selected when the up bits are less than fifty percent and when jam_det is not detected. Nevertheless, turbo-mode is selected if up bits are greater than fifty percent, and/or are affected. Therefore, the jammer detector in the circuitry provides a fast control to the state machine to request turbo-mode, however, the counting of the up bits provides a slower response but also provides a redundant method to request turbo-mode through the state machine, even in the absence of jamming being detected in the RF signal.

Figure 7:
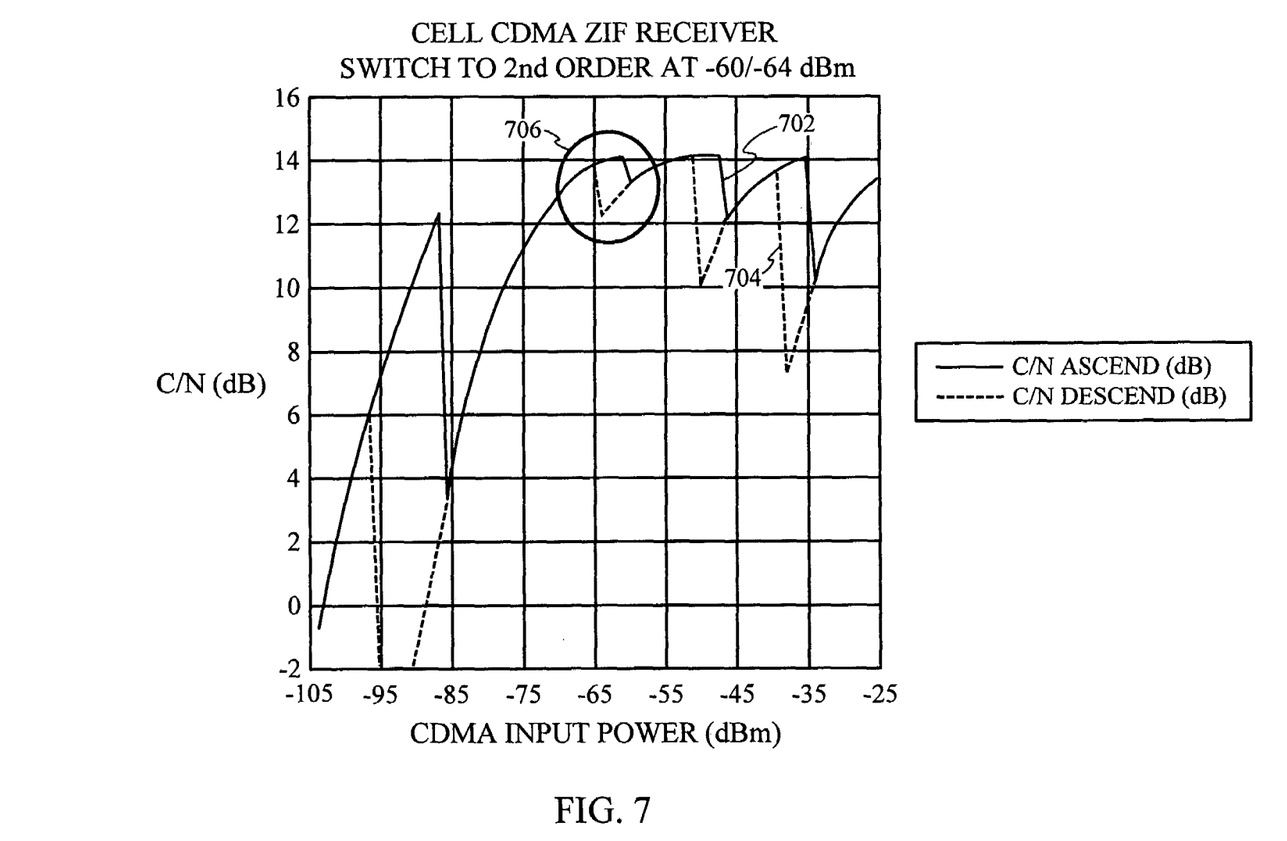
FIG. 7 is a diagram illustrating an analog to digital converter reduced bit width or a delta sigma analog to digital converter switching to a lower order if the total interference in the signal is greater than a programmable threshold or if the RSSI is greater than a programmable threshold.

FIG. 7 illustrates the carrier-to-noise level wherein the effective bitwidth of the receiver is reduced. Area 706 depicts a switch to second order by a $\Delta\Sigma$ analog to digital converter, wherein the total interference of the signal is greater than −60 dBm in which the ΔΣ operates as a second order instead of the fourth order based on signal conditions. The switch points, however, may be anywhere since the bit widths may change depending on the usage of the base station.

Therefore, disclosed is a programmable receiver and method for providing the same, wherein the receiver includes a jammer detector coupled to a state machine and the state machine controls the power consumption level based on the detection of jamming in the RF signal or based on signal conditions. Also disclosed is a way to control current in a receiver, wherein the apparatus may take the form a receiver with a baseband processor, or may be incorporated on an RF chip independently, wherein the RF chip communicates with a baseband processor. The current also may be controlled by use of hardware only, software only, or a combination of both hardware and software. In addition, the state machine may be logic circuitry that reads the state of the machine and that has multiple inputs to the receiver to determine the appropriate state of the receiver and to place the receiver in the appropriate state. The controlling of the receiver may take place by adjusting, switching, bypassing, biasing, parsing, turning on or off, or otherwise manipulating components in the receiver or system.

The previous description of the disclosure is provided to enable any person skilled in the art to make or use the present disclosure. The various modifications to these embodiments will be readily apparent to those skilled in the art, and the generic principles defined herein may be applied to other embodiments without the use of the inventive faculty. Thus, the present disclosure is not intended to be limited to the embodiments shown herein but is to be accorded the widest scope consistent with the principles and novel features disclosed herein.

What is claimed is:

1. A programmable dynamic range receiver, comprising:
   a jammer detector for detecting the presence of jamming in an RF signal; and
   a state machine controlling the receiver based on the results of the jammer detector detecting the presence of jamming in the RF signal, the state machine operative to transition the receiver between a plurality of states, said states including at least one state corresponding to a high linearity receiving mode and at least one state corresponding to a low linearity receiving mode,
   wherein the state machine is operative to enter a state corresponding to the high linearity receiving mode faster than entering a state corresponding to the low linearity receiving mode and operative to leave a state corresponding to the high linearity receiving mode slower than leaving a state corresponding to the low linearity receiving mode.

2. The programmable dynamic range receiver of claim 1, further comprising:
   an amplifier being coupled or integral to the jammer detector.

3. The programmable dynamic range receiver of claim 1, further comprising:
   an RF bandpass filter electronically connected to the output of the LNA;
   a mixer coupled to the output of the RF bandpass filter;
   an oscillator coupled to the mixer;
   a low pass filter coupled to the mixer; and
   the jammer detector coupled to the output of the mixer before the input of the low pass filter.

4. The programmable dynamic range receiver of claim 1, further comprising:
   a comparator coupled to the jammer detector for detecting the level of jamming in the RF signal.

5. The programmable dynamic range receiver of claim 1, further comprising:
   a multi-bit Analog-to-Digital converter (ADC) coupled to the jammer detector for detecting the level of jamming in the RF signal.

6. The programmable dynamic range receiver of claim 1, further comprising:
   an attenuator coupled to the input of the jammer detector to prevent leaking of the interference back to the signal path.

7. The programmable dynamic range receiver of claim 1, further comprising:
   means for interfacing the state machine with the jammer detector.

8. The programmable dynamic range receiver of claim 1, wherein the state machine utilizes a FFT calculation to determine jamming in an RF signal.

9. The programmable dynamic range receiver of claim 1, further comprising:
   a power control, including an up bit counter to adjust the gain in the receiver, the up bit counter results being reported to the state machine for controlling the receiver based on an avenge of up bits.

10. The programmable dynamic range receiver of claim 9, further comprising:
    a timer for providing temporal hysteresis between high and low power consumption modes based on a combination of average number of up bits counted in a period of time or the presence of jamming in the RF signal.

11. The programmable dynamic range receiver of claim 1, further comprising:
    an analog to digital converter being coupled the output of a mixer, wherein an analog to digital converter goes to fewer number of effective bits if the total interference in the channel is less than a predetermined threshold.

12. The programmable dynamic range receiver of claim 1, wherein the state machine comprises logic circuitry.

13. The programmable dynamic range receiver of claim 1, wherein the state machine controls the receiver by software, hardware, or a combination of software and hardware.

14. The programmable dynamic range receiver of claim 1, wherein the state machine controls the receiver by adjusting, switching, parsing, biasing, turning on or off, or otherwise manipulating components of the receiver or system.

15. A programmable dynamic range receiver, comprising:
    a power control component, including an up bit counter to adjust the gain in the receiver, the up bit counter results being reported to a state machine for controlling the receiver based on an average of up bits, the state machine operative to transition the receiver between a plurality of states, said states including at least one state corresponding to a high linearity receiving mode and at least one state corresponding to a low linearity receiving mode,
    wherein the state machine is operative to enter a state corresponding to the high linearity receiving mode faster than entering a state corresponding to the low linearity receiving mode and operative to leave a state corresponding to the high linearity receiving mode slower than leaving a state corresponding to the low linearity receiving mode.

16. A method of providing programmable linearity in a receiver, comprising:

detecting the presence of jamming in the RF signal; and controlling the receiver based on the results of the detecting step indicating the presence of jamming in the RF signal, said controlling performed by a state machine operative to transition the receiver between a plurality of states, said states including at least one state corresponding to a high linearity receiving mode and at least one state corresponding to a low linearity receiving mode, wherein the state machine is operative to enter a state corresponding to the high linearity receiving mode faster than entering a state corresponding to the low linearity receiving mode and operative to leave a state corresponding to the high linearity receiving mode slower than leaving a state corresponding to the low linearity receiving mode.

17. The method of claim 16, further comprising:

providing the results of the detecting step indicating the presence of the jamming in the RF signal step to a component in the receiver.

18. The method of claim 16, further comprising:

providing a filter to reject band jammers.

19. The method of claim 16, wherein the state machine controls the low-noise amplifier based on the results of detecting the presence of jamming in the RF signal so as to lower the power consumption of the programmable receiver when jamming is not present in the RF signal.

20. The method of claim 16, further comprising:

after detecting the presence of jamming in the RF signal, measuring the amount of jamming in the RF signal;

comparing the amount of jamming in the RF signal versus a threshold amount; and providing the results of the measured amount of jamming in the RF signal step to the receiver.

21. The method of claim 16, further comprising:

providing temporal hysteresis to the receiver depending upon the results of the step of detecting the presence of jamming in the RF signal.

22. The method of claim 16, further comprising the step of:

providing means for determining a carrier-to-noise ratio for detecting the presence of jamming in the RF signal.

23. The method of claim 22, further comprising the step of:

utilizing the means for determining the carrier-to-noise ratio to count the number of up bits in a time period to detect the presence of jamming in the RF signal.

24. The method of claim 16, further comprising the step of:

providing an analog to digital converter being coupled to the output of a mixer, wherein the analog to digital converter goes to fewer bits if the total interference in the channel is less than a predetermined threshold.

25. An integrated chip (IC) for providing programmable linearity in a receiver, comprising:

a jammer detector for detecting the presence of jamming in an RF signal; and a state machine controlling the receiver based on the results of the jammer detector detecting the presence of jamming in the RF signal, the state machine operative to transition the receiver between a plurality of states, said states including at least one state corresponding to a high linearity receiving mode and at least one state corresponding to a low linearity receiving mode, wherein the state machine is operative to enter a state corresponding to the high linearity receiving mode faster than entering a state corresponding to the low linearity receiving mode and operative to leave a state corresponding to the high linearity receiving mode slower than leaving a state corresponding to the low linearity receiving mode.

26. The integrated chip of claim 25, wherein the integrated chip is an RF chip.

27. An integrated chip (IC) for providing programmable linearity in a receiver, comprising:

means for detecting the presence of jamming in the RF signal; and state machine means for controlling the receiver based on the results received from the means for detecting indicating the presence of jamming in the RF signal, the state machine means operative to transition the receiver between a plurality of states, said states including at least one state corresponding to a high linearity receiving mode and at least one state corresponding to a low linearity receiving mode, wherein the state machine means is operative to enter a state corresponding to the high linearity receiving mode faster than entering a state corresponding to the low linearity receiving mode and operative to leave a state corresponding to the high linearity receiving mode slower than leaving a state corresponding to the low linearity receiving mode.

28. The integrated chip of claim 27, wherein the integrated chip is an RF chip.

* * * * *